March 15, 1932. H. W. HEIDERGOTT 1,849,455
SLIDEWAY FOR MACHINE TOOLS AND PROCESS OF PRODUCING SAME
Filed Aug. 20, 1930
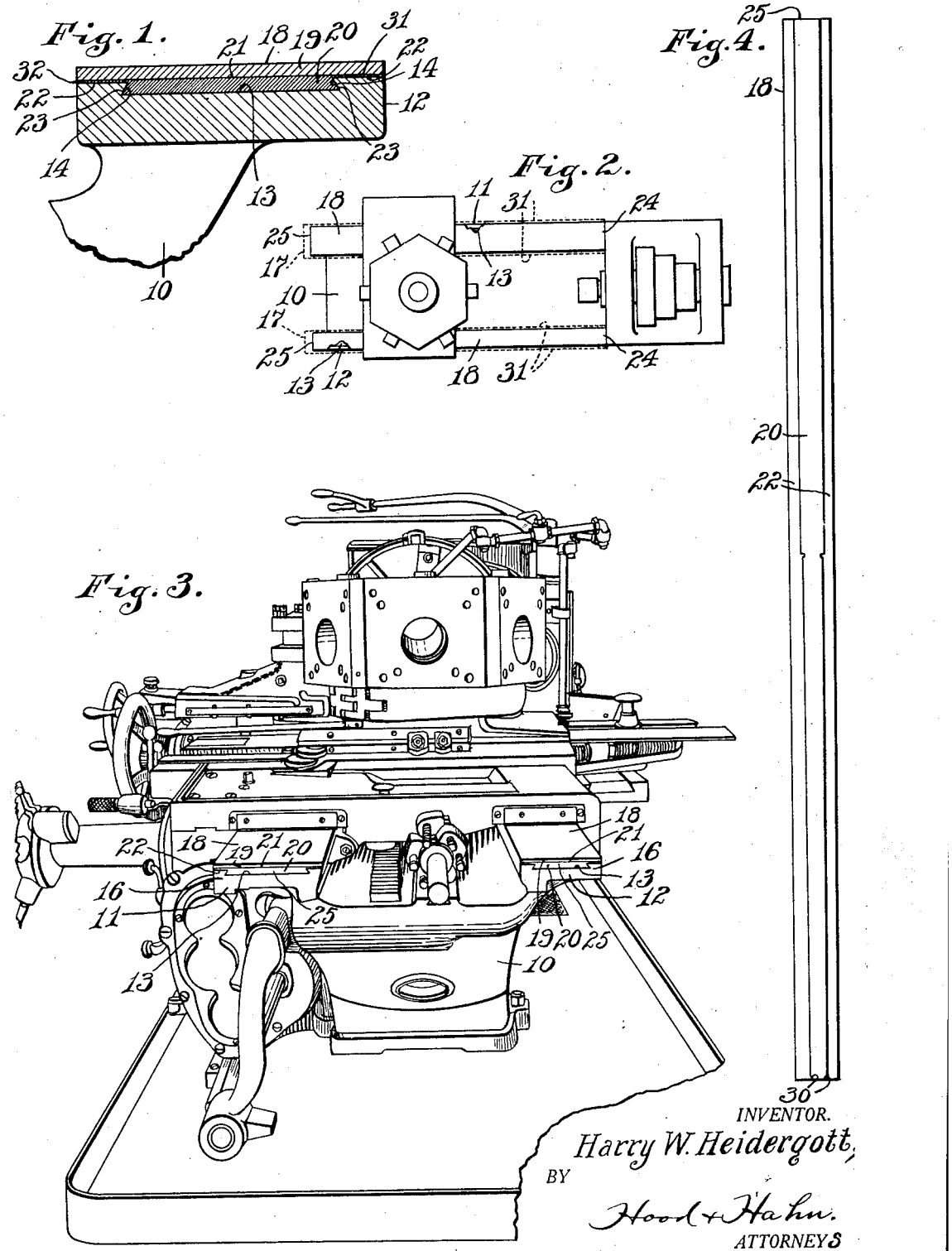
INVENTOR.
Harry W. Heidergott,
BY
Hood + Hahn.
ATTORNEYS Patented Mar. 15, 1932

1,849,455

UNITED STATES PATENT OFFICE

HARRY W. HEIDERGOTT, OF INDIANAPOLIS, INDIANA, ASSIGNOR TO INTERNATIONAL MACHINE TOOL COMPANY, OF INDIANAPOLIS, INDIANA, A CORPORATION OF INDIANA

SLIDEWAY FOR MACHINE TOOLS AND PROCESS OF PRODUCING SAME

Application filed August 20, 1930. Serial No. 476,552.

The present application relates to slideways for machine tools, and to a method of producing the same, the primary object of the invention being to provide highly accurate slideways which shall be of such character as to withstand wear and to maintain their true form throughout an unprecedented period of use. Further objects of the invention will appear as the description proceeds.

In the accompanying drawings, I have illustrated one embodiment of my invention and in said drawings, Fig. 1 is a sectional view of a slideway constructed according to the present invention;

Fig. 2 is a more or less diagrammatic plan of the bed of a machine tool constructed in accordance with my invention;

Fig. 3 is a perspective view of a machine tool embodying my invention; and

Fig. 4 is a bottom plan of an insertion strip in one form which it may take, the taper thereof being exaggerated.

One type of machine tool comprises a bed having slideways upon which is slidably mounted a turret for moving a cutting tool with respect to a piece of work mounted in the machine, or a platform for moving a piece of work with respect to a cutting tool mounted on the machine. The turret or platform is slidable upon the slideways and, in the operation of the machine, is intermittently moved backward and forward along the slideways.

Common practice in the past has been to construct the slideways as integral elements of the cast bed, the bed and slideways being formed of cast iron. According to this practice, the upper surfaces of the slideways have been carefully polished and trued to form as accurate guiding surfaces for the turret or platform as are commercially practicable.

The primary disadvantage of this construction lies in the fact that pieces of work and cutting tools are often dropped upon the slideways and, because of the relatively soft character of the cast iron, the slideways are thus pitted and marred. Furthermore, continual sliding of the reciprocable element of the machine across the cast iron slideways often scores the upper surfaces of the slideways, so that, after a period of use, the slideways no longer present the smooth, relatively frictionless surfaces to the bearing surfaces of the turret or platform that they were intended to present. Eventually, a machine of this type must be taken out of service and either discarded or rebuilt by planing down the bearing surfaces of the slideways and reboring the relatively movable elements of the machine.

It will be seen that it is highly desirable to provide a machine of this character with slideways of a material so hard as not to be damaged by tools or pieces of work dropped thereon, and as not to be scored by the reciprocation of the movable element thereon. According to the present invention, the bearing surfaces of the slideways are formed of tempered high-carbon steel or other material of comparable hardness, and I find it commercially possible to use steels having a scleroscope hardness in excess of 75. It is, of course, absolutely essential to secure the high-carbon steel slideways rigidly and intimately to the machine bed. To obtain the best results, the slideways should be founded on the machine bed, and the term "found" and its derivatives will be used throughout the specification and claims to designate that firm and solid attachment whereby the strips or slideways are secured to the tool bed as a foundation, the attachment being effected by intimate contact between infinitesimally spaced portions of the strips and corresponding portions of the bed throughout the entire lengths of the strips.

Referring more particularly to the drawings, it will be seen that I have illustrated a machine of this type, the bed of which comprises a main section 10 having a pair of spaced parallel elevated longitudinally extending tables 11 and 12. Common practice forms the surfaces of said tables 11 and 12 as the slideways for the turret or platform. According to the present invention, each of said tables is formed in its upper surface with a channel 13, the side walls of which are downwardly and outwardly undercut as at 14. The angle of this cut to the vertical is preferably about 10 degrees, but the same may be varied between about 7 degrees and about 25 degrees without materially affecting the function of the channel. In most instances, correspondingly located horizontal lines in the opposite undercut walls of either of the channels 13 may be parallel, but in the case of an extremely long machine, it has been found to be desirable to taper the channels slightly. While the taper may, in some cases, be uniform throughout the length of the channel, it is desirable, in long machines, to taper the channel from its outer end to a point substantially midway between the ends, to reduce the width of the channel slightly at such midway point, and to continue the taper from the point of such reduction to the opposite end of the channel along lines parallel to the tapered sides of the wider portion of the channel.

In each of the channels 13 there is mounted a composite strip 18, the upper portion 19 of said strip being formed of high-carbon steel while the lower portion 20 thereof is formed of low-carbon steel, the two portions being joined by what may be termed a welded joint as at 21.

While the composite strip herein disclosed may be manufactured in several ways, I have found that a desirable procedure is as follows. A strip of high-carbon steel and a strip of low-carbon steel are placed in facing engagement with each other and are heated substantially to a welding temperature after which the two strips are simultaneously passed between rolls under a heavy pressure, still in contact with each other, and at a temperature substantially that of welding. By this method a very intimate joinder of the two strips over the entire area of their contacting faces is effected. After this rolling operation, the strips 19 and 20 having been integrally joined to form a single composite strip 18, a rabbet 22 is cut in each lateral edge of the portion 20 of the composite strip. The depth of this rabbet is substantially equal to the depth of the channel 13, but preferably the rabbet is one or two thousandths of an inch shallower than the channel, to provide for relief of the lower surface of the composite strip when it is subsequently driven into the channel. The width of the rabbets 22 is slightly less than the width of the bounding surface 31 at each side of the channel 13.

After the rabbets have been cut, the composite strip 18 is subjected to a heating and tempering operation whereby the desired hardness of the high-carbon portion 19 of the strip is produced; and thereafter, the opposite faces of the composite strip are ground to true parallelism and the highest practical flatness.

The short wall 23 of each of the rabbets 22 is then undercut, as shown, the angle of this undercut being identical with the angle of the undercut walls 14 of the channel 13. A depending dovetail tongue is thus formed on the composite strip 18, said tongue being flanked by horizontal plane surfaces 32 of low-carbon material. The leading corner of each of the walls 23 is then bevelled, as shown at 30.

It will be obvious that this machining of the cooperating parts of the device must be highly accurate. After the parts are formed, one end of the portion 20 of the composite strip 18 is entered in the channel 13 at the end 16 of the table 11 or 12 with the undercut tongue of the portion 20 received between the walls 14 of the channel, the bevelled portions 30 of the walls 23 assisting in the entering thereof. By suitable means, the strip 18 is then forced longitudinally into the channel 13 until its end 24 abuts the stationary portion of the machine bed. It will be noted that, in this position, the end 17 of the table projects beyond the end 25 of the strip. It will also be noted that the lands 31 bounding the channel project laterally beyond the edges of the composite strip.

While, as has been stated, any suitable means may be used to force the composite strip home, I have found that a hydraulic ram is the most satisfactory means for accomplishing this step.

After the two strips 18 have been positioned, their upper surfaces are again ground to attain desired smoothness, and thereafter the portions of the bed which project beyond the limits of the strips are cut away flush with the limits of the strips. Under certain circumstances, it may become desirable to make some or all of these cuts at such positions as to take small portions of the strips 18.

It will be seen that this method of assembling the machine assures an absolutely firm continuous founding of the strips on the bed, the tongues of the portions 20 of the strips engaging integrally with walls 14 of the channels at infinitesimally spaced points throughout the lengths thereof. While hardened steel strips might be attached to the upper surfaces of the ordinary cast iron ways by a plurality of screws, or the like, and while some advantages might flow from this arrangement, certain very definite disadvantages would still remain. Thus, while the strips would be intimately attached to the bed at a plurality of spaced points at which said strips are engaged by the screws, they would, in time, become warped between the screws and would lift off the bed, not only throwing the sliding surfaces out of true, but leaving spaces into which "dope" used to lubricate the cutters might creep and be retained to set up a corrosive effect. Furthermore, screws of the type which can be inserted and still leave an uninterrupted surface flush with the surface of the ways are necessarily formed of relatively soft material which, in time, will wear away to leave pits in the surfaces of slideways. Still further, screws of this character, once inserted, can be removed only with the very greatest difficulty in case repairs or replacements should become necessary. None of the above disadvantages attach to the present construction.

While the reasons for the composite construction of the strips 19 and 20 should be immediately obvious, it may be mentioned that such reasons include the substantial impossibility of machining high-carbon steel of the type desirably used for the working surfaces of the slideways, and the well known fact that composite strips are less liable to distortion under heating and machining operations than are homogeneous strips.

I have discovered that an initial rabbeting of the corners of the low-carbon layer, prior to the heat treatment resulting in hardening of the high-carbon layer, is of decided advantage. When a non-rabbeted composite strip is heat-treated to harden the high-carbon layer internal stresses are set up and these stresses are relieved during the removal of the substantial bodies at the rabbets and there is a consequent warping and twisting of the composite strip to such an extent as to practically prevent, except at great cost, the reduction of the upper surface to the necessary accuracy, whereas, by removing the major portion of surplus material before hardening, the further machining to bring the dovetail to proper dimensions requires the removal of so small a quantity of material as not to materially distort the strip, so that the upper hardened wearing surface may be properly reduced without too great expense.

The term "high-carbon" and "low-carbon" are used to differentiate between two materials which when subjected simultaneously to a heat treatment will respond differently as to required hardness, rather than to indicate any particular chemical composition.

I claim as my invention:

1. In a machine having two relatively sliding members one of said members being formed with a channel, and a composite strip composed of two layers integrally bonded together throughout their entire adjacent areas, the lower layer being formed of machinable metal and being provided with a tongue having a driving fit in said channel, and founded therein throughout its entire length, and the upper layer being formed of wear-resisting hard metal, the other of said members being slidably mounted on said last-mentioned strip.

2. In a machine having two relatively sliding members one of which is formed with a channel, a strip of machinable metal formed with a tongue having a driving fit in said channel, the upper surface of said strip overlying the surfaces of said bed bounding said channel and founded thereon throughout the length of said strip and said tongue engaging the walls of said channel at infinitesimally spaced points throughout its length to prevent displacement thereof from the plane of said strip, a strip of relatively hard metal integrally bonded throughout its length on said first-mentioned strip and coextensive with the upper surface thereof, and the other member sliding on said last-mentioned strip.

3. In a machine having two relatively sliding members one of which is formed with a dovetail channel, a strip of machinable metal formed with a dovetail tongue having a driving fit in said channel and engaging the walls of said channel at infinitesimally spaced points throughout its length to prevent displacement thereof from the plane of said strip, the upper surface of said strip overlying the surfaces of said bed bounding said channel and founded thereon throughout the length of said strip, a strip of wear-resisting hard metal integrally superposed on said first-mentioned strip and coextensive with the upper surface thereof, the other member being slidably mounted on said last-mentioned strip.

4. In a machine having two relatively sliding members one of which is formed with a dovetail channel, a strip of machinable metal formed with a dovetail tongue conforming in shape to said channel and having a driving fit therein, and founded thereon throughout the length of said strip, a strip of metal having a scleroscope hardness of at least 75 integrally superposed on said first-mentioned strip and coextensive with the upper surface thereof, the other member being slidably mounted on said last-mentioned strip.

5. The method of forming a slideway for a machine which includes the steps of providing a composite strip of untempered high-carbon steel and low-carbon steel, cutting a rabbet in each lateral edge of said low-carbon steel portion, treating said composite strip to temper said high-carbon steel portion, and subsequently undercutting corresponding walls of said rabbets to form a dovetail tongue.

6. The method of forming a slideway for a machine which includes the steps of providing a composite strip of untempered high-carbon steel and low-carbon steel, cutting a rabbet in each lateral edge of said low-carbon steel portion, treating said composite strip to bring said high-carbon steel portion to a scleroscope hardness of at least 75, without affecting said low-carbon steel portion, and undercutting corresponding walls of said rabbets to form a dovetail tongue.

7. The method of forming a slideway for a machine which includes the steps of providing a composite strip of untempered high-carbon steel and low-carbon steel, cutting a rabbet in each lateral edge of said low-carbon steel portion, treating said composite strip to temper said high-carbon steel portion, without affecting said low-carbon steel portion, grinding the opposite faces of said composite strip to true parallelism and flatness, undercutting corresponding walls of said rabbets to form a dovetail tongue, and bevelling the corners at one end of said tongue.

8. The method of forming a slideway for a machine which consists in cutting in a member of said machine a dovetailed channel, flaring said channel from one end to a point substantially at the center of length thereof, widening said channel slightly at said point, and flaring said channel from said point of widening thereof to the opposite end thereof, providing a composite metallic strip, the upper portion of which is formed of material having a hardness of the order of tempered high-carbon steel and the lower portion of which is formed of a softer metal, undercutting the edges of said lower portion to form a tongue conforming to the shape of said channel, and driving said tongue longitudinally into said channel.

9. A machine bed comprising an untempered main body, and a composite slideway strip composed of two layers infinitesimally bonded together throughout their entire adjacent areas, the lower layer being uniformly founded throughout its length on the main body against displacement at right angles to the opposed wear surface of the upper layer of said strip being wear-resisting hard and the lower layer being substantially less hard.

10. A machine bed comprising an untempered main body, and a composite slideway strip composed of two layers infinitesimally bonded together throughout their entire adjacent areas, the lower layer being uniformly founded throughout its length on the main body against displacement at right angles to the opposed wear surface of the upper layer, the lower layer of said strip being formed of machinable metal, and the upper layer having a hardness of the order of tempered high-carbon steel.

11. A machine bed comprising an untempered main body, and a composite slideway strip composed of two layers infinitesimally bonded together throughout their entire adjacent areas, the lower layer being uniformly founded throughout its length on the main body against displacement at right angles to the opposed wear surface of the upper layer, the lower layer of said strip being formed of machinable metal, and the upper layer being formed of metal having a scleroscope hardness of at least 75.

In witness whereof, I have hereunto set my hand at Indianapolis, Indiana, this 13th day of August, A. D. one thousand nine hundred and thirty.

HARRY W. HEIDERGOTT.

CERTIFICATE OF CORRECTION.

Patent No. 1,849,455.                            Granted March 15, 1932, to

HARRY W. HEIDERGOTT.

It is hereby certified that error appears in the printed specification of the above numbered patent requiring correction as follows: Page 1, line 47, for "married" read marred; page 3, line 44, for "required" read acquired; page 4, line 34, claim 9, after the word "layer" insert a comma and the words the upper layer; and that the said Letters Patent should be read with these corrections therein that the same may conform to the record of the case in the Patent Office.
   Signed and sealed this 3rd day of May, A. D. 1932.

(Seal)                                                      M. J. Moore,
                                                           Acting Commissioner of Patents.